(12) United States Patent
Choi (10) Patent No.: US 11,186,154 B2
(45) Date of Patent: Nov. 30, 2021

(54) WEATHER STRIP STRUCTURE FOR VEHICLE MOUNTED WITH OPPOSITE SLIDING DOORS

(71) Applicants: Hyundai Motor Company, Seoul (KR); Kia Motors Corporation, Seoul (KR)

(72) Inventor: Je-Won Choi, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 132 days.

(21) Appl. No.: 16/599,413

(22) Filed: Oct. 11, 2019

(65) Prior Publication Data

US 2020/0215893 A1    Jul. 9, 2020

(30) Foreign Application Priority Data

Jan. 4, 2019    (KR) .......................... 10-2019-0001265

(51) Int. Cl.
| | |
|---|---|
| *B60J 10/84* | (2016.01) |
| *B60J 10/36* | (2016.01) |
| *B60J 10/23* | (2016.01) |
| *B60J 7/04* | (2006.01) |
| *B60J 5/06* | (2006.01) |

(52) U.S. Cl.
CPC ............... *B60J 10/84* (2016.02); *B60J 10/36* (2016.02); *B60J 5/06* (2013.01); *B60J 7/04* (2013.01); *B60J 10/23* (2016.02)

(58) Field of Classification Search
CPC ..... B60J 10/84; B60J 10/85; B60J 5/06; B60J 5/062
See application file for complete search history.

(56) References Cited

U.S. PATENT DOCUMENTS 4,544,198 A * 10/1985 Ochiai .................. B60J 5/0479
296/155
4,991,905 A * 2/1991 Watanabe .................. B60J 5/06
296/155
(Continued)

FOREIGN PATENT DOCUMENTS

GB          765044 A  *  1/1957  ........... B62D 25/081
JP        61181722 A  *  8/1986  ............. B60R 13/04
(Continued)

*Primary Examiner* — Marcus Menezes
(74) *Attorney, Agent, or Firm* — Morgan, Lewis & Bockius LLP (57) ABSTRACT

A weather strip structure for vehicle may include a body weather strip mounted on an opening flange and sealing a gap between a vehicle body and the doors; and an upper weather strip mounted on a roof panel and sealing a gap between the roof panel and the vehicle body; a bent portion into which a cowl cross bar is inserted and which is curvedly mounted along the vehicle body at a lateral side of a mounting unit mounted on the vehicle body; a rectilinear portion which rectilinearly connects end portions of the bent portion along the opening flange; and a frame portion which is connected to intersection points between the bent portion and the rectilinear portion and defines a frame of the body weather strip, wherein a hollow space is formed between the rectilinear portion and the bent portion, and the mounting unit is positioned inside the hollow space.

10 Claims, 11 Drawing Sheets

(56) References Cited

U.S. PATENT DOCUMENTS

| | | | |
|---|---|---|---|
| 2005/0116496 A1* | 6/2005 | Lowson | B60J 5/062 296/146.11 |
| 2009/0315362 A1* | 12/2009 | Michnik | B60J 5/06 296/155 |
| 2012/0023830 A1* | 2/2012 | Bazzi | B60J 10/84 49/484.1 |
| 2015/0246603 A1* | 9/2015 | Silvestrini | B60J 10/24 296/93 |
| 2020/0189490 A1* | 6/2020 | Choi | B60J 5/06 |
| 2020/0238805 A1* | 7/2020 | Choi | B60J 10/84 |

FOREIGN PATENT DOCUMENTS

| | | | | |
|---|---|---|---|---|
| JP | 62012414 A | * | 1/1987 | B60J 10/38 |
| JP | 02070549 A | * | 3/1990 | E05D 15/1047 |
| JP | 2587954 B2 | * | 3/1997 | B60J 10/22 |
| JP | 2003335136 A | * | 11/2003 | B60J 10/80 |
| KR | 10-1371488 B1 | | 3/2014 | |
| WO | WO-2018152276 A1 | * | 8/2018 | B60J 10/33 |

* cited by examiner

WEATHER STRIP STRUCTURE FOR VEHICLE MOUNTED WITH OPPOSITE SLIDING DOORS

CROSS-REFERENCE TO RELATED APPLICATIONS

The present application claims priority to Korean Patent Application No. 10-2019-0001265, filed on Jan. 4, 2019, the entire contents of which is incorporated herein for all purposes by this reference.

BACKGROUND OF THE INVENTION

Field of the Invention

The present invention relates to a weather strip structure for a vehicle mounted with opposite sliding doors, and particularly, to a weather strip structure for a vehicle mounted with opposite sliding doors, which allows a vehicle body and a door to be sealed without changing a mounting position of a cowl cross bar even though a front door is configured as a sliding door by utilizing a bent portion of a body weather strip.

Description of Related Art

In general, doors for opening and closing an occupant compartment include front doors which are disposed at a front side in a longitudinal direction of a vehicle, and rear doors which are disposed at a rear side in the longitudinal direction of the vehicle.

Recently, a necessity of completely opening a door opening to allow a disabled person to be easily accommodated in the vehicle and make it easy to load articles becomes a serious issue, and as a result, sliding doors, which are opened or closed by being pushed laterally, are required to be disposed.

Not only the rear door is configured as the sliding door, but also the front door is configured as the sliding door, such that the rear door and the front door may be opened or closed in opposite directions.

However, in the case in which the front door is also configured as the sliding door, an opening flange needs to be shifted forward for a user's convenience when the user gets in or out of the vehicle. Therefore, the shift of the opening flange is accompanied with the modification of a weather strip that seals the opening flange.

Regarding a weather strip of a vehicle mounted with sliding doors, a conventional sliding door apparatus for a vehicle that moves forward and rearward in the longitudinal direction of the vehicle to open or close a door opening of a vehicle body, includes a sliding door which is slidably disposed, a door weather strip which is attached to the sliding door, a pressure switch which detects an internal pressure of the door weather strip, and a pneumatic pressure line which connects the door weather strip and the pressure switch so that the door weather strip and the pressure switch are in communication with each other.

However, there is a problem in that sealability of the weather strip in the related art deteriorates in the case in which the front door is configured as the sliding door, a shape of the opening flange is changed, and thus a shape of the weather strip is changed to correspond to the changed shape of the opening flange.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a weather strip structure for a vehicle mounted with opposite sliding doors, which has a rectilinear opening flange and allows a vehicle body and a door to be sealed without changing a mounting position of a cowl cross bar even though a front door is configured as a sliding door by utilizing a bent portion of a body weather strip of a weather strip structure for a vehicle in the related art.

Various aspects of the present invention are directed to providing a weather strip structure for a vehicle mounted with opposite sliding doors, the weather strip structure including: a body weather strip which is mounted on an opening flange and seals a gap between a vehicle body and the doors; and an upper weather strip which is mounted on a roof panel and seals a gap between the roof panel and the vehicle body, in which the body weather strip may further include a bent portion into which a cowl cross bar is inserted and which is curvedly mounted along the vehicle body at a lateral side of a mounting unit mounted on the vehicle body; a rectilinear portion which rectilinearly connects both end portions of the bent portion along the opening flange; and a frame portion which is connected to intersection points between the bent portion and the rectilinear portion and defines a frame of the body weather strip, and a hollow space is formed between the rectilinear portion and the bent portion, and the mounting unit is positioned inside the hollow space.

The frame portion may be formed integrally with the bent portion, and the bent portion and the rectilinear portion may be connected to the frame portion.

The frame portion may be formed integrally with the rectilinear portion, and the rectilinear portion and the bent portion may be connected to the frame portion.

The bent portion and the rectilinear portion may be connected by injection molding.

The rectilinear portion may have an ineffective sealing section formed in an operating space of a roller coupled to the vehicle body.

The bent portion may further include a carrier fixed to a flange formed on an external panel of the vehicle body.

The bent portion may further include a 'U'-shaped internal steel member which is formed in the carrier and opens the carrier so that the flange is inserted.

The bent portion may further include a 'T'-shaped internal steel member which is formed in the carrier and opens the carrier so that the flange is inserted.

The bent portion may further include a 'T'-shaped clip which is inserted into the carrier and penetrates the bent portion and the external panel.

According to an exemplary embodiment of the present invention having the aforementioned configuration, the rectilinear opening flange may be implemented even though the front door is configured as the sliding door, and as a result, it is possible to improve sealability between the vehicle body and the door.

According to an exemplary embodiment of the present invention, the rectilinear opening flange is implemented, and a shape of a crash pad coupled to the opening flange is also formed in a rectilinear shape, and as a result, there is an advantage in that an external appearance is not impaired.

According to an exemplary embodiment of the present invention, the vehicle body and the door are sealed without changing a mounting position of the cowl cross bar, and as a result, there is an advantage in that it is possible to prevent vibration caused by the separation between a center portion of the cowl cross bar and the mounting position.

According to an exemplary embodiment of the present invention, the mounting unit into which the cowl cross bar is inserted is positioned inside the hollow space between the bent portion and the rectilinear portion, such that a periphery of the cowl cross bar is sealed without applying a cowl cross bar cover, and as a result, there is an advantage in that costs are reduced and sealability is improved.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, the present invention will be described in detail with reference to the accompanying drawings. However, the present invention is not restricted or limited by exemplary embodiments. Like reference numerals indicated in the respective drawings refer to members which perform substantially the same functions.

Figure 1A:
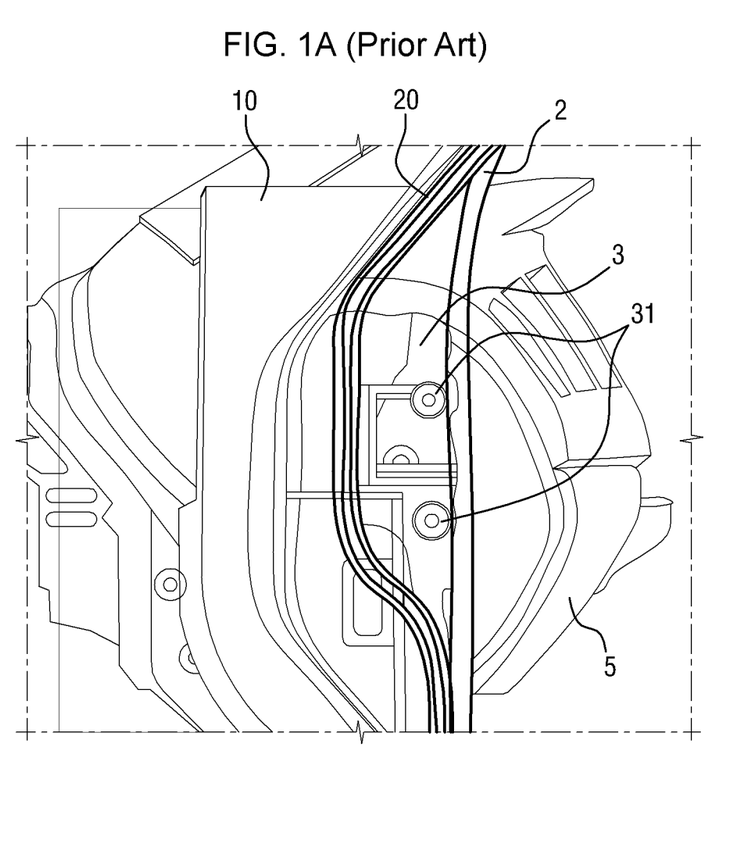
FIG. 1A is a view exemplarily illustrating a state in which an opening flange and a body weather strip mounted on the opening flange are shifted in a case in which a front door is configured as a sliding door.

FIG. 1A is a view exemplarily illustrating a state in which an opening flange 10 and a body weather strip 200 mounted on the opening flange 10 are shifted in a direction toward a front side of a vehicle and mounted in a case in which a front door is configured as a sliding door.

In a case in which the front door and a rear door of the vehicle are mounted to be slidable in opposite directions, it is necessary to ensure maximum opening amounts of the doors to prevent a user's foot from being caught by the door when the user gets in or out of the vehicle.

However, referring to FIG. 1A, in the case of the front door, the opening flange 10 may be shifted in the direction toward the front side of the vehicle to ensure an opening amount of the front door.

The shift of the opening flange 10 is accompanied with the modification of the body weather strip 200 which is mounted on the opening flange 10 and seals a gap between a vehicle body 1 and the door when the door is closed.

Therefore, rectilinear sealing 2 in the related art is changed to a curved sealing 20 along the opening flange 10.

If the body weather strip 200 is not modified corresponding to the shape of the opening flange 10, there may occur a serious problem with watertightness because the opening flange 10 and the body weather strip 200 are spaced from each other.

A mounting unit 3 is positioned below a dashboard panel 5, allows a cowl cross bar to be inserted thereinto, and is mounted on the vehicle body 1 to connect the cowl cross bar to the vehicle body 1. The mounting unit 3 may be positioned at a rear side of the rectilinear sealing 2 in the related art, and fixing units 31, which mount the mounting unit 3 on the vehicle body 1, may also be positioned at the rear side of the rectilinear sealing 2.

Figure 1B:
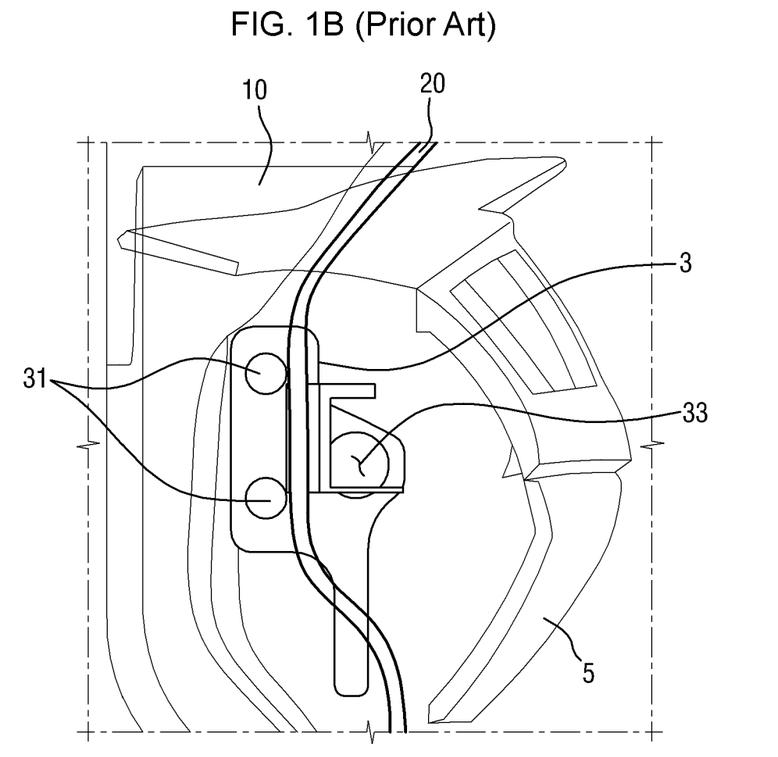
FIG. 1B is a view exemplarily illustrating a state in which a mounting unit into which a cowl cross bar is inserted is shifted in the case in which the front door is configured as the sliding door.

FIG. 1B is a view exemplarily illustrating a state in which the mounting unit 3 into which the cowl cross bar is inserted is shifted in the case in which the front door is configured as the sliding door.

Referring to FIG. 1B, the shift of the opening flange 10 in the direction toward the front side of the vehicle needs to be accompanied with the shift of the mounting unit 3.

Like the opening flange 10, the mounting unit 3 is shifted in the direction toward the front side of the vehicle, such that the fixing unit 31, which is shifted forward, and an insertion portion 33, into which the cowl cross bar is inserted, are spaced from each other in a longitudinal direction of the vehicle body 1.

In the instant case, since a center portion of the cowl cross bar and the fixing units 31 for fixing the cowl cross bar to the vehicle body 1 are spaced from one another, there is a problem of deterioration in steering vibration performance related to attenuation of steering vibration caused by the user's steering operation.

Figure 2A:
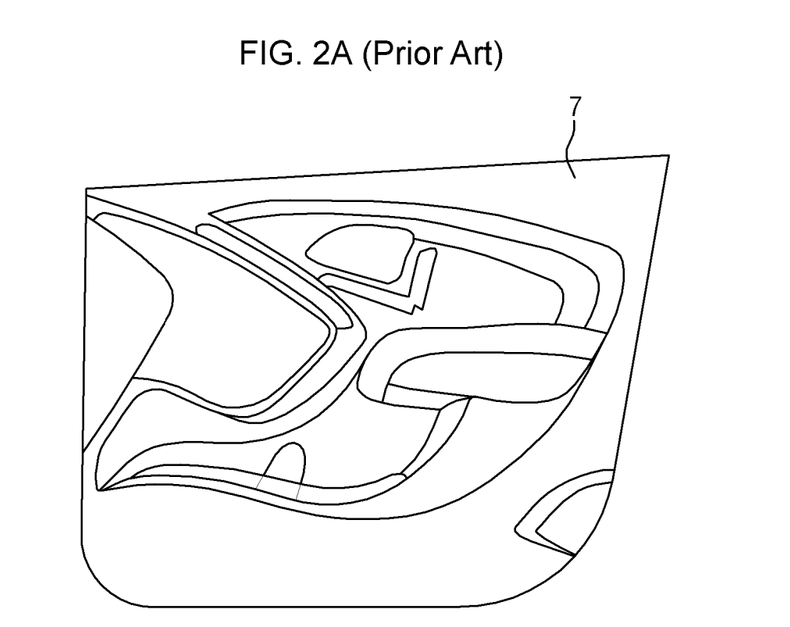
FIG. 2A is a view exemplarily illustrating an internal front side of a door trim in the related art.
Figure 2B:
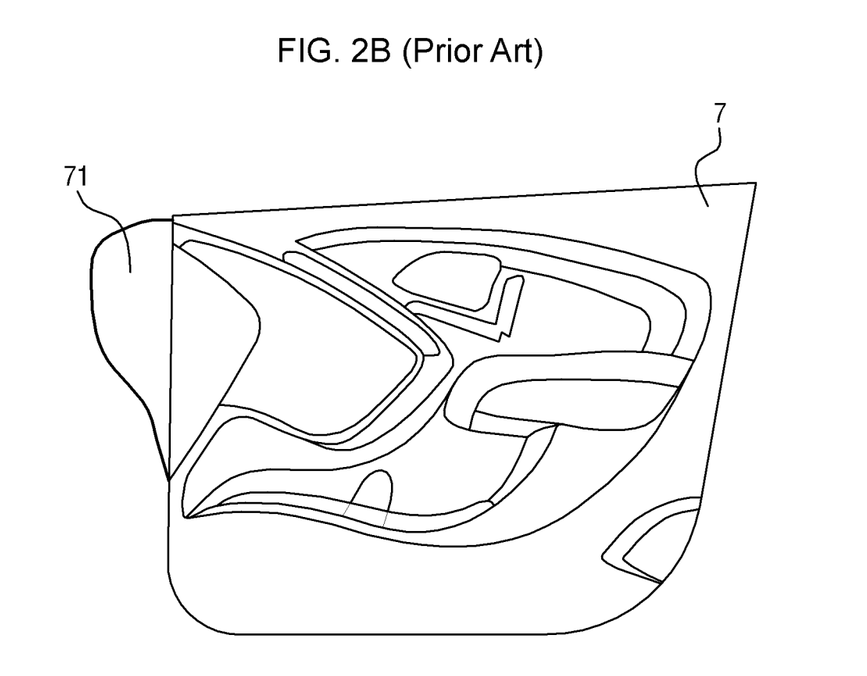
FIG. 2B is a view exemplarily illustrating an internal front side of a door trim which is modified based on a modification of the opening flange.

FIG. 2A is a view exemplarily illustrating an internal front side of a door trim 7 in the related art, and FIG. 2B is a view exemplarily illustrating an internal front side of a door trim 7 which is modified based on a modification of the opening flange 10.

When the opening flange 10 is shifted in the direction toward the front side of the vehicle, an external appearance of the door trim 7, which is formed to correspond to the opening flange 10 when the door is closed, may be modified.

The door trim 7 is modified from the shape in the related art illustrated in FIG. 2A to the shape illustrated in FIG. 2B in which an additional panel 71 is formed to correspond to the opening flange 10 shifted in the direction toward the front side of the vehicle, and as a result, the external appearance thereof is impaired.

Figure 3:
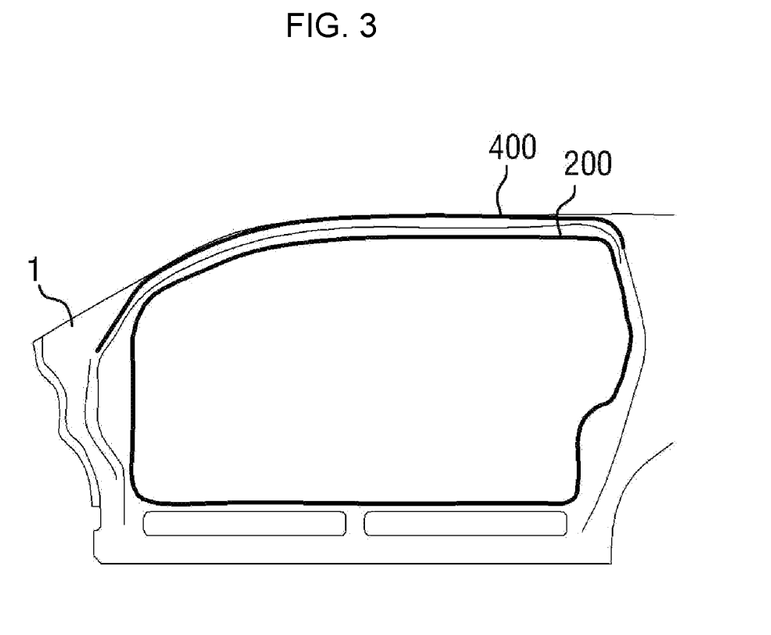
FIG. 3 is a view exemplarily illustrating a body weather strip and an upper weather strip according to an exemplary embodiment of the present invention.

To solve the aforementioned problem, FIG. 3 illustrates a weather strip structure for a vehicle mounted with opposite sliding doors according to an exemplary embodiment of the present invention.

Referring to FIG. 3, the weather strip structure for a vehicle mounted with opposite sliding doors according to an exemplary embodiment of the present invention may include the body weather strip 200 and an upper weather strip 400.

The body weather strip 200 is mounted on the opening flange 10 and may seal a gap between the vehicle body 1 and the door. The upper weather strip 400 is mounted on a roof panel and may seal a gap between the roof panel and the vehicle body 1.

Figure 4A:
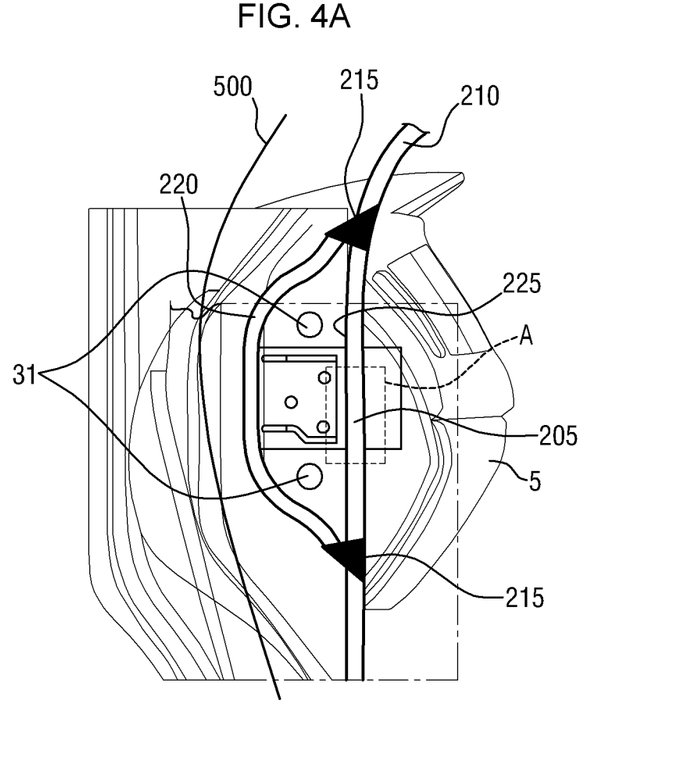
FIG. 4A is a view exemplarily illustrating a structure of the body weather strip according to an exemplary embodiment of the present invention.

FIG. 4A is a view exemplarily illustrating a structure of the body weather strip 200 according to an exemplary embodiment of the present invention.

Referring to FIG. 4A, the body weather strip 200 according to an exemplary embodiment of the present invention may include a bent portion 220, a rectilinear portion 205, and a frame portion 210.

The frame portion 210 is connected to intersection points 215 between the bent portion 220 and the rectilinear portion 205 and may define an entire frame of the body weather strip 200.

The cowl cross bar is inserted into the bent portion 220. The bent portion 220 is mounted at a lateral side of the mounting unit 3 mounted on the vehicle body 1. The bent portion 220 is curvedly mounted along the vehicle body 1 which is shifted in the direction toward the front side of the vehicle to ensure the opening amount of the front door.

Since the bent portion 220 is formed, the modified vehicle body 1 and the body weather strip 200 are not spaced from each other, and the gap between the vehicle body 1 and the door may be sealed.

The rectilinear portion 205 is formed to rectilinearly connect both end portions of the bent portion 220. Since the rectilinear portion 205 is formed in a rectilinear shape, the rectilinear opening flange 10 may be maintained without being shifted toward the front side of the vehicle.

Since the opening flange 10 is formed in a rectilinear shape, the door trim 7, which is formed to correspond to the opening flange 10, may have the same shape as the door trim 7 in the related art illustrated in FIG. 2A.

A hollow space 225 having a vacant space is formed between the rectilinear portion 205 and the bent portion 220, and the mounting unit 3 may be positioned inside the hollow space.

Since the hollow space 225 having a vacant space is formed between the rectilinear portion 205 and the bent portion 220, it is not necessary to shift the mounting unit 3 having the fixing units 31, which is configured to connect the cowl cross bar to the vehicle body 1, in the direction toward the front side of the vehicle.

Therefore, the mounting unit 3 may be mounted on the vehicle body 1 through the hollow space 225. Since the mounting unit 3 and the center portion of the cowl cross bar are spaced from each other, there is no deterioration in steering vibration performance related to the attenuation of the steering vibration caused by the user's steering operation.

A door parting line 500 may be maintained as it is, and as a result, the opposite sliding doors may be implemented without changing a door panel 77 or the door trim 7.

The rectilinear portion 205 may have an ineffective sealing section in an operating space of a roller coupled to the vehicle body 1.

Figure 4B:
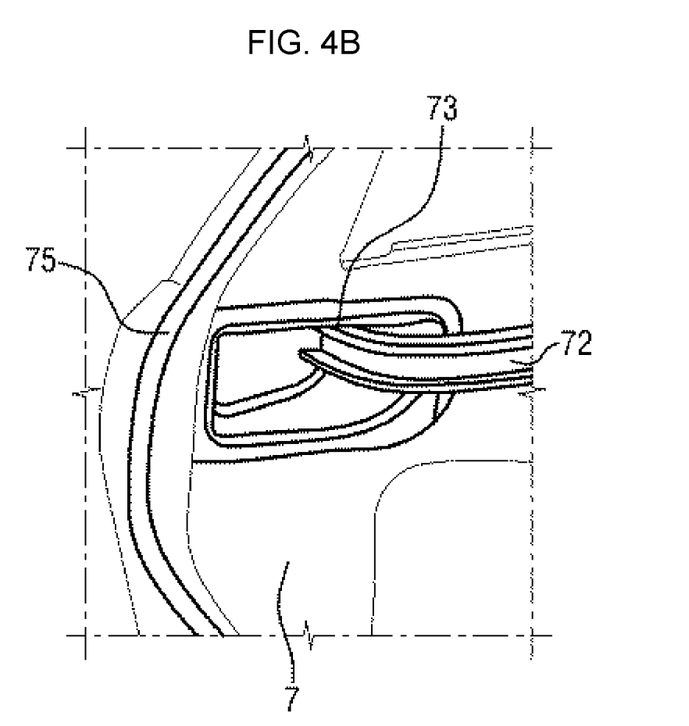
FIG. 4B is a view exemplarily illustrating an internal of opposite sliding doors in which a rail is mounted.

FIG. 4B is a view exemplarily illustrating an internal of opposite sliding doors in which a rail 72 is mounted.

The rail 72 and the roller may be provided so that the opposite sliding doors slide in the opposite directions.

In the instant case, the rail 72, which is mounted at the center portion of the vehicle body 1 in the related art and allows the roller to roll to open the door, may be mounted inside the door so that the rail 72 is not exposed to the outside.

In the case in which the rail 72 is mounted inside the door, the roller is mounted on the vehicle body 1 to correspond to the rail 72, and the rail 72 enables the roller to slide when opening or closing the door.

A door bulkhead bracket 73 having a recessed shape may be mounted inside the door to ensure a mounting space of the roller and accommodate the roller when closing the door.

In the case in which the door is mounted on the vehicle body 1, a portion of the rectilinear portion 205, which is in contact with the door and corresponds to a height of the door bulkhead bracket 73, has the ineffective sealing section.

The portion of the rectilinear portion 205, except for the ineffective sealing section, may seal the gap between the door and the opening flange 10.

Figure 5A:
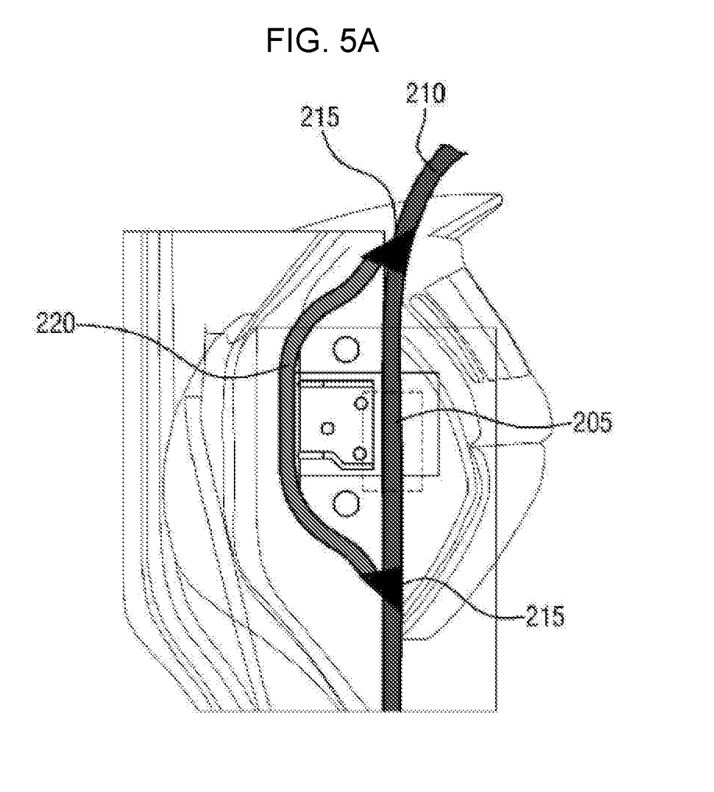
FIG. 5A is a view exemplarily illustrating a state in which a rectilinear portion and a frame portion according to an exemplary embodiment of the present invention are integrally formed.

FIG. 5A is a view exemplarily illustrating a state in which the rectilinear portion 205 and the frame portion 210 according to an exemplary embodiment of the present invention are integrally formed. Referring to FIG. 5A, the frame portion 210 may be formed integrally with the rectilinear portion 205, and the rectilinear portion 205 and the bent portion 220 may be connected to the frame portion 210.

Figure 5B:
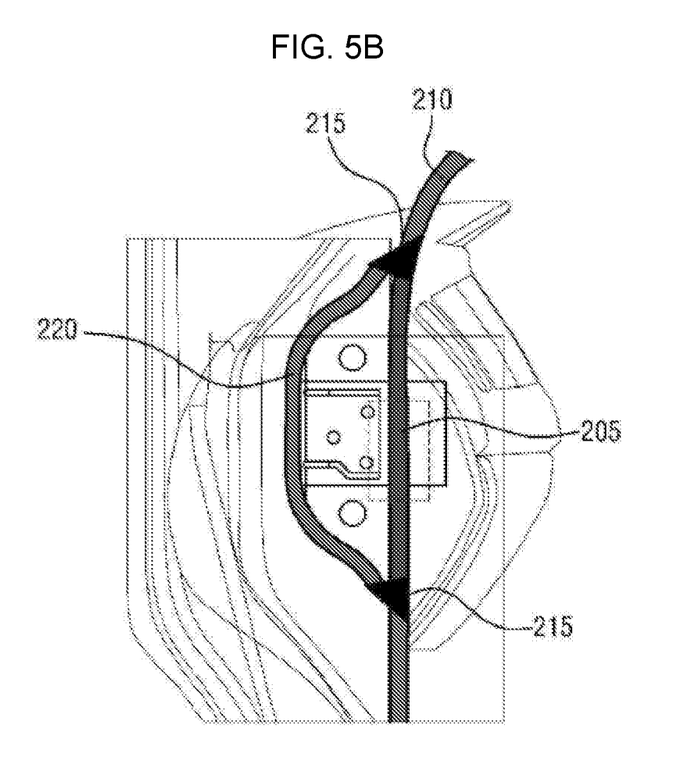
FIG. 5B is a view exemplarily illustrating a state in which a curved portion and the frame portion according to an exemplary embodiment of the present invention are integrally formed.

FIG. 5B is a view exemplarily illustrating a state in which a curved portion and the frame portion 210 according to an exemplary embodiment of the present invention are integrally formed. Referring to FIG. 5B, the frame portion 210 may be formed integrally with the bent portion 220, and the bent portion 220 and the rectilinear portion 205 may be connected to the frame portion 210.

In the instant case, the bent portion 220 and the rectilinear portion 205 may be connected to each other as the intersection points 215 are formed by injection molding.

Figure 6A:
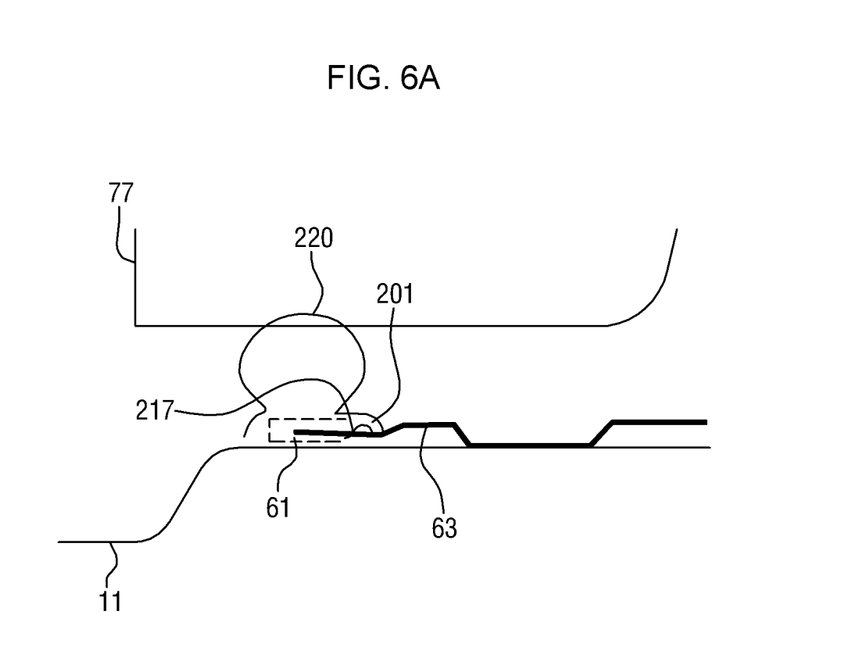
FIG. 6A is a view exemplarily illustrating a state in which a bent portion according to an exemplary embodiment of the present invention is mounted on a vehicle body by a 'U'-shaped internal steel member.
Figure 6B:
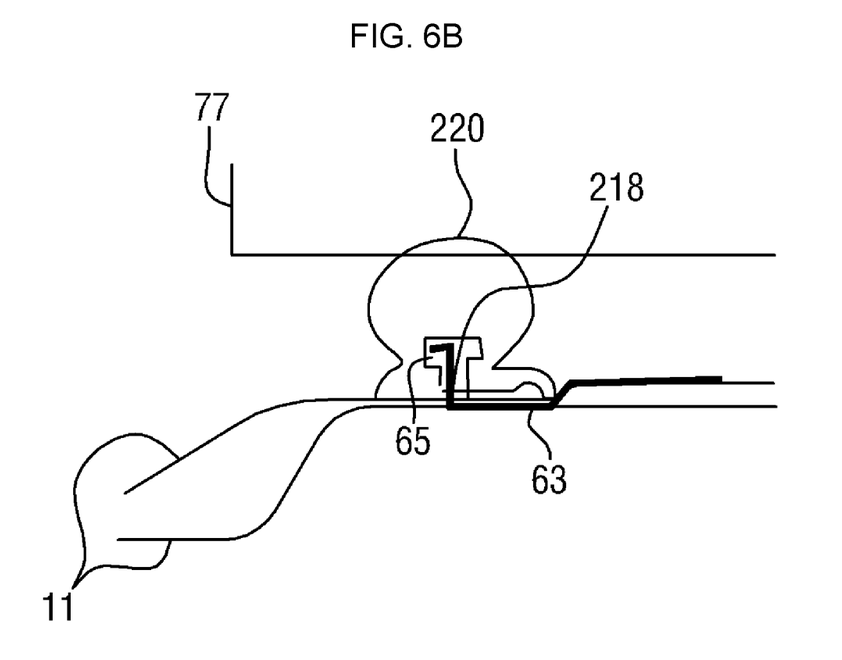
FIG. 6B is a view exemplarily illustrating a state in which the bent portion according to the exemplary embodiment of the present invention is mounted on the vehicle body by a 'T'-shaped internal steel member.
Figure 6C:
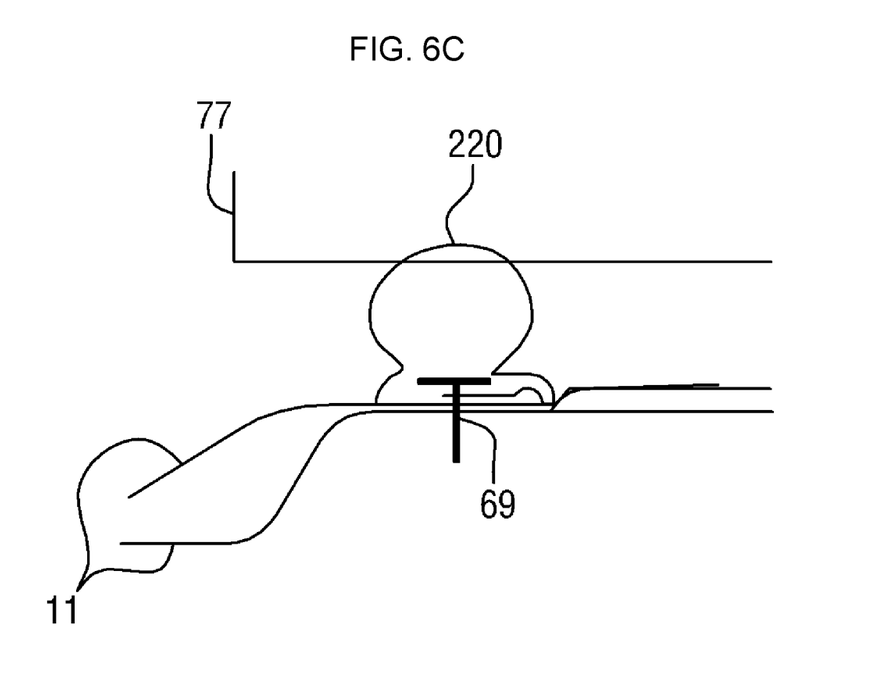
FIG. 6C is a view exemplarily illustrating a state in which the bent portion is mounted on the vehicle body by a 'T'-shaped clip according to the exemplary embodiment of the present invention.

FIG. 6 is a view exemplarily illustrating a state in which the bent portion 220 according to the exemplary embodiment of the present invention is mounted on the vehicle body 1. Referring to FIG. 6, the bent portion 220 may have a carrier 201 fixed to a flange 63 formed on an external panel 11 of the vehicle body 1.

FIG. 6A is a view exemplarily illustrating a state in which the bent portion 220 according to the exemplary embodiment of the present invention is mounted on the vehicle body 1 by a 'U'-shaped internal steel member 61.

Referring to FIG. 6A, the bent portion 220 may further include the 'U'-shaped internal steel member 61 which is formed in the carrier 201 and opens the carrier 201 so that the flange 63 is inserted.

The carrier 201 is opened laterally and inserted into an opening 217 formed at a lateral side of the 'U'-shaped internal steel member 61, such that the bent portion 220 may be mounted on the vehicle body 1.

FIG. 6B is a view exemplarily illustrating a state in which the bent portion 220 according to the exemplary embodiment of the present invention is mounted on the vehicle body 1 by a 'T'-shaped internal steel member 65.

Referring to FIG. 6A, the bent portion 220 may further include the 'T'-shaped internal steel member 65 which is formed in the carrier 201 and opens the carrier 201 so that the flange 63 is inserted.

The carrier 201 is opened laterally and inserted into an opening 218 formed at a lower side of the 'T'-shaped internal steel member 65, and the carrier 201 is inserted by being bent to an upper side of the 'T'-shaped internal steel member, such that the bent portion 220 may be mounted on the vehicle body 1.

FIG. 6C is a view exemplarily illustrating a state in which the bent portion 220 according to the exemplary embodiment of the present invention is mounted on the vehicle body 1 by a 'T'-shaped clip 69.

Referring to FIG. 6C, the bent portion 220 may further include the 'T'-shaped clip 69 which is inserted into the carrier 201 and penetrates the bent portion 220 and the external panel 11.

The clip 69 is inserted into the vehicle body 1 to penetrate the external panel 11 from the internal of the bent portion 220, such that the bent portion 220 may be mounted on the vehicle body 1.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A weather strip structure for a vehicle mounted with opposite sliding doors, the weather strip structure comprising:
   a body weather strip which is mounted on an opening flange and seals a gap between a vehicle body and the doors when the opposite sliding doors are in a closed position; and
   an upper weather strip which is mounted on a roof panel and seals a gap between the roof panel and the vehicle body,
   wherein the body weather strip includes:
      a bent portion into which a cowl cross bar is configured to be inserted and which is curvedly mounted along the vehicle body at a lateral side of a mounting unit mounted on the vehicle body;
      a rectilinear portion which rectilinearly connects a first end portion and a second end portion of the bent portion along the opening flange; and
      a frame portion which is connected to intersection points between the bent portion and the rectilinear portion and defines a frame of the body weather strip, and
   wherein a hollow space is formed between the rectilinear portion and the bent portion, and the mounting unit is positioned inside the hollow space.

2. The weather strip structure of claim 1, wherein the frame portion is formed integrally with the bent portion, and the first end portion and the second end portion of the bent portion and the rectilinear portion are connected to the frame portion.

3. The weather strip structure of claim 2, wherein the bent portion and the rectilinear portion are connected by injection molding.

4. The weather strip structure of claim 1, wherein the frame portion is formed integrally with the rectilinear portion, and the rectilinear portion and the first end portion and the second end portion of the bent portion are connected to the frame portion.

5. The weather strip structure of claim 4, wherein the bent portion and the rectilinear portion are connected by injection molding.

6. The weather strip structure of claim 1, wherein the rectilinear portion has an ineffective sealing section, which is formed in an operating space of a roller coupled to the vehicle body and corresponds to a height of a door bulkhead bracket mounted inside the door.

7. The weather strip structure of claim 1, wherein the bent portion further includes a carrier fixed to a flange formed on an external panel of the vehicle body.

8. The weather strip structure of claim 7, wherein the bent portion further includes a 'U'-shaped internal steel member and the carrier is inserted into an opening formed at a side of the 'U'-shaped internal steel member so that the bent portion is mounted on the vehicle body.

9. The weather strip structure of claim 7, wherein the bent portion further includes a 'T'-shaped internal steel member and the carrier is inserted into an opening formed at a side of the 'T'-shaped internal steel member so that the bent portion is mounted on the vehicle body.

10. The weather strip structure of claim 7, wherein the bent portion further includes a 'T'-shaped clip which is inserted into the carrier and penetrates the bent portion and the external panel.

* * * * *